United States Patent [19]

Schluchter et al.

[11] 4,421,291

[45] Dec. 20, 1983

[54] DEVICE TO COMPENSATE FOR CRITICAL SPEEDS OF MACHINES

[75] Inventors: Martin Schluchter, Birr; Paul Schröder, Wettingen, both of Switzerland

[73] Assignee: BBC Brown, Boveri & Company, Limited, Baden, Switzerland

[21] Appl. No.: 165,061

[22] Filed: Jul. 1, 1980

[30] Foreign Application Priority Data

Jul. 3, 1979 [CH] Switzerland .......................... 6190/79

[51] Int. Cl.³ ............................................ F16M 13/00
[52] U.S. Cl. ................................................ 248/635
[58] Field of Search ............... 248/558, 559, 560, 618, 248/635, 636

[56] References Cited

U.S. PATENT DOCUMENTS

| | | | |
|---|---|---|---|
| 2,115,653 | 4/1938 | Snyder | 248/635 |
| 2,138,176 | 11/1938 | Keys | 248/635 X |
| 4,066,234 | 1/1978 | Nycum | 248/558 |

FOREIGN PATENT DOCUMENTS

| | | | |
|---|---|---|---|
| 59985 | 10/1938 | Norway | 248/635 |
| 231622 | 4/1925 | United Kingdom | 248/635 |
| 394111 | 6/1933 | United Kingdom | 248/560 |
| 494851 | 11/1938 | United Kingdom | 248/635 |

Primary Examiner—William H. Schultz
Attorney, Agent, or Firm—Oblon, Fisher, Spivak, McClelland & Maier

[57] ABSTRACT

Exchangeable elastic elements having an adaptable spring property which are installed in recesses provided in at least fastening part of a casing member for compensation in critical speed operation of vertical groups of machines. Compensation for critical speed operation of a mounted machine is possible by exchanging elastic elements or by changing the number of elastic elements utilized. The exchangeable elastic elements may include at least one borehole formed therewithin and within which a fastening element is disposed. The exchangeable elastic elements may be composed of different materials or have different spring properties and may also be designed as slide-in parts for insertion within the recesses provided in the at least one fastening part of the casing.

4 Claims, 2 Drawing Figures

DEVICE TO COMPENSATE FOR CRITICAL SPEEDS OF MACHINES

BACKGROUND OF THE INVENTION

1. Field of the Invention

The present invention concerns a device to compensate for critical speed operation of vertical groups of machines.

2. Description of the Prior Art

Power and processing machines, particularly electrical machines, are generally known which are preferably located by means of a flange on a base or intermediate parts. In the case of operation of these machines, the critical speeds thereof are to be avoided since they can become dangerous in operation based upon the construction limitations of such machines. As is known, the critical speed is that speed which coincides with the natural frequency of rotating bodies and such is particularly dangerous when all parts are not well balanced.

SUMMARY OF THE INVENTION

It is therefore the object of the present invention to provide a device to compensate for critical speeds of vertical groups or groupings or machines where the mounting elasticity thereof is selected with simple technical means and, additionally, can also be adapted so that dangerously high vibrations of the machine are avoided.

The advantage of the invention lies in the fact that the exchangeable elastic elements resting in the recesses provided therefor permit changing of the mounting elasticity also in the case of groups of machines already erected in a quick and simple manner and to thus obtain sufficient resonance intervals and to reduce the vibration amplitudes through the attenuation properties of the elastic elements.

Further, advantageous embodiments in accordance with the present invention include the provision for a borehole and fastening element, preferably a screw, which secures the position of the elastic elements or selection of the appropriate material for the elastic element so as to favorably influence the resulting compensation. The elements can, for example, consist of steel, brass or of a plastic reinforced with glass fibers. It also goes without saying that some recesses can remain empty or be filled only partially with the elastic elements and such can be either solid or laminated.

A further embodiment of the present invention calls for the exchangeable elastic elements to be designed as slide-in parts which facilitate the replacement of the elastic elements.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
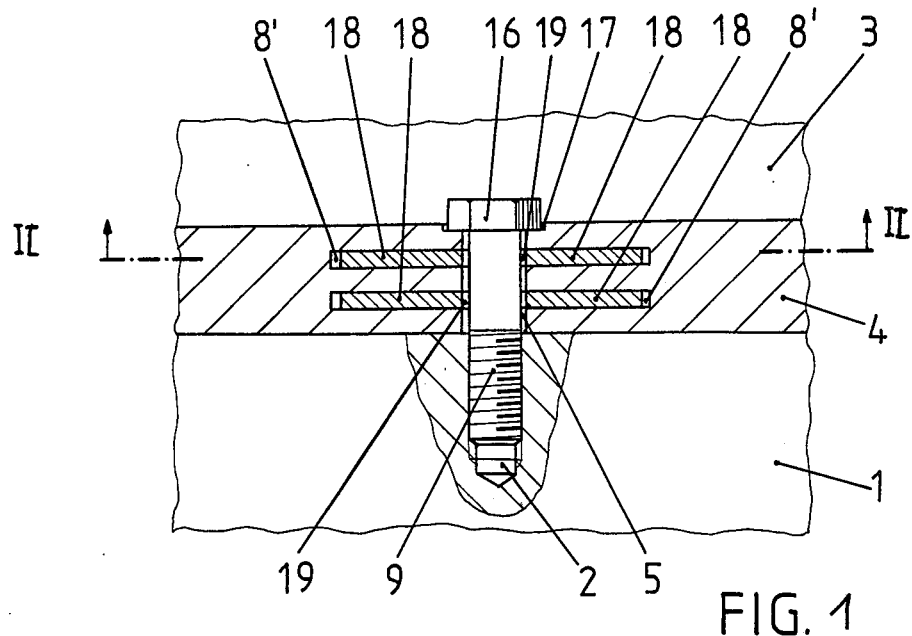
FIG. 1 shows a partial cross-sectional view taken along the line I—I of FIG. 2 including one embodiment according to the invention wherein two elastic exchangeable elements are fixed in a flange.
Figure 2:
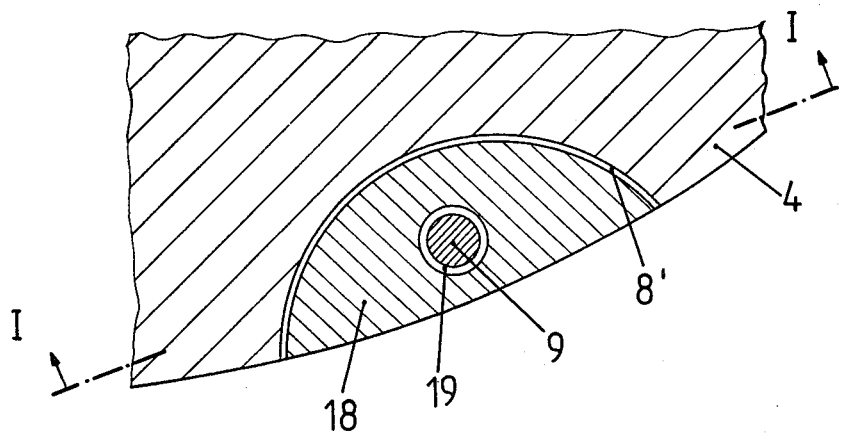
FIG. 2 shows the cross-sectional view taken along line II—II of FIG. 1.

According to FIGS. 1 and 2, a base 1 is provided with a borehole 2. A casing 3 includes a flange 4 which serves as a fastening part of the casing 3. Two recesses 8' are provided in flange 4. Elastic exchangeable elements 18 are positioned in recesses 8'. Exchangeable elements 18 are designed as slide-in parts which are inserted either manually or mechanically into recesses 8' after being properly oriented with respect to recesses 8' and are provided with boreholes 19 which are intended for insertion of screw 9.

A head member 16 serves the purpose of assisting screwing into place of screw 9. Head 16 is partially embedded in a recess 17 provided in the surface of flange 4 and screw 9 serves to connect the flange 4 with the base 1.

The slide-in parts which constitute exchangeable elements 18 consist of steel and are therefore solid. These exchangeable elements can also be laminated or consist of another material. The mounting elasticity of casing 3 and thus of the machine can also be additionally adapted by the selection of material and the design of the slide-in parts of exchangeable elements 18.

It goes without saying that several devices according to the object of the invention can be arranged along the circumference of the groups of machines. The thickness of the slide-in parts of exchangeable elements 18 corresponds to the thickness of the recesses 8'.

Two recesses 8' are shown in FIG. 1. However, in some cases, one recess 8' can be sufficient although three or more can also be used as well.

It should be noted that FIG. 2 shows a view in an upward direction taken along the line II—II of FIG. 1 and which therefore demonstrates an edge portion of flange 4. Accordingly, recesses 8', 8' are formed in this edge portion of flange 4 so as to therefore allow for inserting elements 18, 18 to be pushed into the recesses 8', 8' formed in the flange. The thickness of these inserts substantially corresponds to the height of recesses 8', 8'.

As can also be appreciated, the inserts 18, 18 are provided with a borehole 19. The flange 4 and thereby the casing 1 are attached to the base by a screw 9 which penetrates the flange 4 and the inserts 18. When the screw 9 is tightened, the flange 4 is compressed, causing the inserts 18 to come into contact with the corresponding surfaces of the recesses 8', 8'. Depending on the material and the spring properties of the inserts 18, the elasticity of the flange 4 in the area of attachment can thereby be influenced. Correspondingly, inserts 18 made of a "softer" material than that of the flange 4 increases the installation elasticity whereas inserts made of a material greater spring hardness reduce the installation elasticity. By placing the recesses 8', 8' on the side of flange 4 and by making a borehole 19 in the insert elements 18, such can be exchanged after the machine has been successfully installed. To this end, screw 9 must be removed, the insert elements 18, 18 removed from the recess 8', 8' and replaced by an insert element with a desired property. It is to be further noted that the sectional view in FIG. 2 shows that the insert elements are formed in segments and are arcuate-shaped and plate-shaped in connection with FIG. 1. FIG. 2 also shows that the recesses 8', 8' are arranged on the side of the flange 4 and the insert elements 18 can be pulled out of recesses 8', 8' in the drawing plane.

Accordingly, it can be seen from the foregoing that the advantage of the present invention lies in its ability to compensate for a critical speed of a mounted machine by exchanging or by changing the number of elastic elements 18.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A vertical electrical machine for compensating for critical speed characteristics thereof comprising:
   a base;
   a casing;
   a flange member having at least one borehole formed therein interconnecting the casing with said base, said flange member having at least one laterally accessible recess formed therein on a side portion of said flange member;
   at least one plate-shaped elastic element having a borehole formed therein mounted in said at least one recess, the thickness of said elastic element substantially corresponding to the height of the at least one recess; and
   fastening means extending through said borehole formed in said flange member and the elastic element for pressing said flange member onto said base.

2. A device according to claim 1, said at least one elastic element comprising a plurality of elastic elements wherein each elastic element comprises a different material from the remaining elastic elements.

3. A device according to claim 1, said at least one exchangeable elastic element comprising a slide-in part for insertion within said at least one recess.

4. A device according to claim 1, said at least one elastic element comprising a plurality of elastic elements, each of said elastic elements having a different spring property from the remaining elastic elements.

* * * * *